United States Patent
Kwon et al.

(10) Patent No.: US 11,802,346 B2
(45) Date of Patent: Oct. 31, 2023

(54) MANUFACTURING METHOD OF NICKEL PLATED STEEL SHEET AND NICKEL PLATED STEEL SHEET PREPARED THEREFROM

(71) Applicant: TCC Steel Corp., Pohang-si (KR)

(72) Inventors: Tae Woo Kwon, Pohang-si (KR); Hyun Jun Baek, Pohang-si (KR); Yoon Han Kim, Pohang-si (KR); Jun Mo Jeon, Daegu (KR)

(73) Assignee: TCC Steel Corp., Gyeongsangbuk-Do (KR)

( * ) Notice: Subject to any disclaimer, the term of this patent is extended or adjusted under 35 U.S.C. 154(b) by 409 days.

(21) Appl. No.: 16/929,431

(22) Filed: Jul. 15, 2020

(65) Prior Publication Data

US 2021/0017663 A1    Jan. 21, 2021

(30) Foreign Application Priority Data

Jul. 16, 2019  (KR) ........................ 10-2019-0085752

(51) Int. Cl.
| | | |
|---|---|---|
| *C25D 5/48* | (2006.01) | |
| *C21D 9/46* | (2006.01) | |
| *C22C 38/00* | (2006.01) | |
| *C25D 3/12* | (2006.01) | |
| *C25D 5/36* | (2006.01) | |

(Continued)

(52) U.S. Cl.
CPC .............. *C25D 5/48* (2013.01); *B32B 15/015* (2013.01); *C21D 9/46* (2013.01); *C22C 38/00* (2013.01); *C25D 3/12* (2013.01); *C25D 5/36* (2013.01); *C25D 5/50* (2013.01); *H01M 50/10* (2021.01); *H01M 50/116* (2021.01)

(58) Field of Classification Search
None
See application file for complete search history.

(56) References Cited

U.S. PATENT DOCUMENTS

| | | | |
|---|---|---|---|
| 10,665,825 B2* | 5/2020 | Horie | ........................ C25D 5/50 |
| 2015/0162576 A1 | 6/2015 | Horie et al. | |
| 2022/0178040 A1* | 6/2022 | Kwon | ...................... C21D 9/46 |

FOREIGN PATENT DOCUMENTS

| | | |
|---|---|---|
| CN | 108368628 A | 8/2018 |
| JP | 2007031727 A | 2/2007 |

(Continued)

OTHER PUBLICATIONS

English translation of JP 2009-263727, EPO, accessed Jun. 15, 2022.*

(Continued)

*Primary Examiner* — Xiaobei Wang
(74) *Attorney, Agent, or Firm* — Harness, Dickey & Pierce, P.L.C.

(57) ABSTRACT

The present invention provides a nickel-plated and thermally-treated steel sheet with excellent corrosion resistance, in which a remaining nickel amount obtained by analyzing an nickel-iron alloy layer using energy dispersive spectrometry (EDS) or electron probe X-ray microanalysis (EPMA) after pure nickel remaining on the nickel-iron alloy layer was completely removed after the heat treatment for alloying of a nickel plated layer with base iron is 0.1 wt % or more to less than 30 wt % of the total amount of iron and nickel.

4 Claims, 5 Drawing Sheets

(51) Int. Cl.
  *B32B 15/01*     (2006.01)
  *C25D 5/50*      (2006.01)
  *H01M 50/116*    (2021.01)
  *H01M 50/10*     (2021.01)

(56) References Cited

FOREIGN PATENT DOCUMENTS

JP      2009263727 A     11/2009
JP       6451919 B1  *   1/2019   ............. C22C 38/00

OTHER PUBLICATIONS

Yang, Yinghui et al.: "Inhibitory effect of Ni—P coating on thermal expansion of carbon steel", Surface & Coatings Technology, vol. 315, Mar. 6, 2017, pp. 484-489, XP 029967480.
Extended European Search Report dated Nov. 13, 2020 for European Patent Application No. 20184772.0.

* cited by examiner

Ni component ratio 4.88%

Norm. mass percent (%)

Spectrum      Fe      Ni
------------------------------
Objects 271  95.12   4.88
------------------------------
Mean value:  95.00   5.00
Sigma:        0.16   0.16
Sigma mean:   0.09   0.09

Ni component ratio 5.20%

Norm. mass percent (%)

| Spectrum | Fe | Ni |
|---|---|---|
| Objects 273 | 94.80 | 5.20 |

Mean value: 94.62 5.38
Sigma:      0.23 0.23
Sigma mean: 0.13 0.13

MANUFACTURING METHOD OF NICKEL PLATED STEEL SHEET AND NICKEL PLATED STEEL SHEET PREPARED THEREFROM

CROSS-REFERENCE TO RELATED APPLICATION

This application claims priority to and the benefit of Korean Patent Application No. 2019-0085752, filed on Jul. 16, 2019, the disclosure of which is incorporated herein by reference in its entirety.

BACKGROUND

1. Field of the Invention

The present invention relates to a method of manufacturing a nickel (Ni)-plated and thermally treated steel sheet for a battery case and a nickel-plated and thermally treated steel sheet manufactured thereby.

2. Discussion of Related Art

Recently, with the development of electronic devices to wireless devices and the development of eco-friendly transportation, battery markets are growing. Particularly, a chargeable/dischargeable secondary battery such as a cylindrical lithium ion battery has a standardized size, and is used in diverse and increasing applications. In recent years, cylindrical lithium ion batteries are also applied to various vehicles such as monocycles and trucks, so that applied fields are significantly increasing.

For a surface-treated steel sheet for a battery case, which is used in a cylindrical secondary battery, corrosion resistance has become an especially important quality requirement for battery stability. As a factor having the greatest influence on corrosion resistance, the amount of an alloy layer of a Ni-plated layer formed by a heat treatment process for alloying, Ni plating and a base iron layer is important, but the quantification of the alloy layer is not standardized yet. For example, in Japanese Patent Laid-Open Publication No. 2009-263727, titled "Ni-plated steel sheet for a container, container manufactured thereof and manufacturing method thereof," a Ni—Fe alloy layer is analyzed by glow discharge spectroscopy (GDS), and as a method of reading the analysis graph obtained by the analysis, a method of quantifying an alloy amount is introduced. However, this method is based on subjective judgement in the method of reading the analysis graph, and may not be a method of quantifying an actual alloy amount.

When the thickness of a Ni—Fe alloy layer is analyzed using conventional GDS, it is not possible to objectively define the Ni—Fe alloy layer from one part to another part in the graph. That is, this method might be an analysis method that lacks objectivity about the result for exactly how thick the alloy layer is. As described above, the Ni—Fe alloy layer is an important quality factor affecting the lifetime of a battery, and thus product management by an objective quantification method is needed.

SUMMARY OF THE INVENTION

The present invention is directed to providing a method of manufacturing a nickel (Ni)-plated and thermally treated steel sheet for a battery case, which includes: forming a Ni-plated layer on at least one surface of a base steel sheet; and forming a Ni-iron (Fe) alloy layer at the interface between the base steel sheet and the Ni-plated layer by heat treatment for alloying of the base steel sheet on which the Ni-plated layer is formed, is provided, and the Ni—Fe alloy layer satisfies Formula 1 below.

$$\{0.1 \leq Ni/(Ni+Fe)*100\} < 30 \qquad \text{<Formula 1>}$$

In Formula 1, Ni represents the content of Ni remaining in a Ni—Fe alloy layer measured by energy dispersive spectrometry (EDS) or electron probe X-ray microanalysis (EPMA) after a Ni-plated layer is completely removed, and Fe represents the mass percent of Fe remaining in a Ni—Fe alloy layer measured by EDS or EPMA after a Ni-plated layer is completely removed.

In the method of manufacturing a Ni-plated and thermally treated steel sheet, the plating weight of the Ni-plated layer may be 2.7 to 44.5 g/m$^2$.

In Formula 1, the value of $\{Ni/(Ni+Fe)*100\}$ may be 0.3 to 25.

Another aspect of the present invention provides a Ni-plated and thermally treated steel sheet for a battery case, which is manufactured by the above-described manufacturing method, and includes a base steel sheet; a Ni-plated layer formed on at least one surface of the base steel sheet; and a Ni—Fe alloy layer formed at the interface between the steel sheet and the Ni-plated layer.

The present invention is directed to providing a method of manufacturing a nickel (Ni)-plated and thermally treated steel sheet with excellent corrosion resistance by providing a Ni weight, which is managed by objective and accurate analysis of an Ni—Fe alloy layer, and an Ni—Fe alloy layer, and a Ni-plated and thermally treated steel sheet manufactured thereby.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

In one embodiment of the present invention, a method of manufacturing a nickel (Ni)-plated and thermally treated steel sheet for a battery case, which includes: forming a Ni-plated layer on at least one surface of a base steel sheet; and forming a Ni-iron (Fe) alloy layer at the interface between the base steel sheet and the Ni-plated layer by heat treatment for alloying of the base steel sheet on which the Ni-plated layer is formed, is provided, and the Ni—Fe alloy layer satisfies Formula 1 below.

$$\{0.1 \leq Ni/(Ni+Fe)*100\} < 30 \qquad <\text{Formula 1}>$$

In Formula 1, Ni represents the content of Ni remaining in a Ni—Fe alloy layer measured by energy dispersive spectrometry (EDS) or electron probe X-ray microanalysis (EPMA) after a Ni-plated layer (Pure Ni Layer) is completely removed, and Fe represents the mass percent of Fe alloyed in a Ni—Fe alloy layer measured by EDS or EPMA after a Ni-plated layer (Pure Ni Layer) is completely removed.

A plating weight of the Ni-plated layer may be 2.7 to 44.5 g/m².

In Formula 1, the value of $\{Ni/(Ni+Fe)*100\}$ may be 0.3 to 25.

In another embodiment of the present invention, a Ni-plated and thermally treated steel sheet for a battery case, which is manufactured by the above-described manufacturing method, and includes a base steel sheet; a Ni-plated layer formed on at least one surface of the base steel sheet; and a Ni—Fe alloy layer formed at the interface between the base steel sheet and the Ni-plated layer, is provided.

The present invention provides a method of manufacturing a Ni-plated and thermally treated steel sheet with excellent corrosion resistance by providing a Ni weight, which is managed by objective and accurate analysis of an Ni—Fe alloy layer, and an Ni—Fe alloy layer, and a Ni-plated and thermally treated steel sheet manufactured thereby.

Based on the characteristics of a battery case, which is the main use of the Ni-plated and thermally treated steel sheet of the present invention, the present invention will be described in detail. A battery case is manufactured by deep processes (drawing and ironing (DNI) and draw thin and redrawing (DTR) of the base of a Ni-plated and thermally treated steel sheet. Here, due to these processes, the thickness of the base decreases approximately 10 to 50%. In this case, when a Ni plating weight is less than 2.7 g/m², it is difficult to exhibit sufficient corrosion resistance due to an insufficient absolute amount to cover the entire Fe base layer, and when a remaining Ni amount (Ni alloyed with Fe) is less than 0.1 wt %, and particularly, less than 0.3 wt % of the total amount of Fe and Ni upon the analysis of a component ratio of the Ni—Fe alloy layer using electron probe X-ray microanalysis (EPMA) or energy dispersive spectroscopy (EDS) after the removal of the pure Ni layer, which is the uppermost layer, during the battery processing, the Ni—Fe alloying layer is not sufficient, so the steel plate does not exhibit sufficient corrosion resistance accompanied by peeling of the plated layer.

On the contrary, when the total Ni plating weight is more than 44.5 g/m², it is not appropriate in terms of production costs due to more Ni plating than necessary, and particularly, it is not preferable because excessive Ni may also cause processing problems such as the generation of Ni dust and cracking in the plated layer in the battery case processing process. In addition, when the component ratio of the Ni—Fe alloy layer was analyzed using EPMA or EDS after the removal of the pure Ni layer, which is the uppermost layer, the remaining (Ni alloyed with Fe) Ni amount is more than 30 wt %, and particularly, more than 25 wt % of the total amount of Fe and Ni, the base Fe layer is diffused a lot to the outside, which also adversely affects corrosion resistance.

In further detail, a conventional steel sheet may be used without limitation as a steel sheet that can be used in the present invention. For example, as the steel sheet, a base for tin plating (black plate) or a cold-rolled steel sheet (CR) may be applied.

The steel plate may be used after suitable pretreatment for Ni plating, and the pretreatment may conventionally include a degreasing or cleaning process, a washing process and a pickling process, but the present invention is not limited thereto.

The thickness of the steel sheet may vary according to its use, and may be, for example, 0.3 mm to 0.5 mm, but the present invention is not limited thereto.

In a subsequent process, the step of forming a Ni-plated layer may be performed by a conventional electroplating method using a conventional electrolytic Ni plating solution (bath). For example, as the electrolytic Ni plating solution, an acidic plating solution including a Watt's bath and a chloride, Sulfamate bath may be used. The Watt's bath may include, for example, 200 to 350 g/L of nickel sulfate, 20 to 60 g/L of nickel chloride, 10 to 50 g/L of boric acid and remainder water with respect to 1 L of the total acidic plating solution, but the present invention is not limited thereto. Work conditions for Ni plating using the plating bath may include a pH of 3.0 to 4.8, a bath temperature of 50 to 70° C. and a current density of 10 to 40 A/dm², but the present invention is not limited thereto.

To provide the gloss of the Ni-plated layer, an additive without a sulfur component may be used. In the case of glossy Ni plating using a polish containing a sulfur component, the hardness of the plated layer increases, corrosion resistance is reduced due to cracks generated during the process, and the possibility of scratches increases due to the accumulation of chips in a processing tool.

Meanwhile, the total Ni plating weight may be 2.7 to 44.5 g/m².

Since the Ni-plated layer has high hardness and low elongation, if it is processed into a battery case without treatment, there are cracks in the Ni-plated layer of the case, and ultimately, rust becomes the basic cause of reducing battery performance. This problem can be solved by the formation of an Ni—Fe alloy layer between the Ni layer and the basic Fe layer through a diffusion heat treatment process after Ni plating and softening of the Ni layer and the Ni—Fe layer during the heat treatment, thereby imparting excellent corrosion resistance even after processing into a battery case. Here, the heat treatment method (type) can include both of continuous heat treatment for alloying (hereinafter, continuous heat treatment) and box heat treatment for alloying (hereinafter, box heat treatment). More specifically, box heat treatment for alloying (box heat treatment), which is batch-type heat treatment at 400 to 500° C. for 1 to 1,500 hours, or continuous heat treatment for alloying (continuous heat treatment), which is continuous heat treatment at 550 to 650° C. for 5 to 2,000 seconds, may be performed. However, as a result of analyzing a surface using equipment for surface quantitative analysis such as EDS or EPMA after the removal of a pure Ni layer, which is the outermost layer, heat treatment conditions (temperature×time) are not particularly limited as long as the remaining Ni amount may be 0.1 to 30 wt %, and particularly, 0.3 to 25 wt % of the total amount of Fe and Ni.

The Ni-plated and thermally treated steel sheet of the present invention may be subjected to the analysis of surface components using an energy dispersive spectrometer (EDS) or electron probe X-ray microanalyzer (EPMA), which are common surface component analysis equipment, after the pure Ni layer, which is the outermost layer, is completely and selectively removed using Ni-removing solutions consisting of an acidic solution and an alkaline solution, following the collection of a Ni plated and thermally-treated steel sheet sample after a heat treatment process for alloying, whereby it can be confirmed that the remaining Ni amount is 0.3 to 30 wt % of the total amount of Fe and Ni. Here, according to EDS analysis, a magnification may be, but is not limited to, 50 to 200 times, an accelerating voltage may be 15 to 25 kV, and a secondary energy counting may be 2 kilo counts per second (kcps) or more.

EXAMPLES

Hereinafter, the present invention will be described in further detail with reference to the following examples, but is not limited thereto.

Examples 1 and 10

As a base steel sheet, a low carbon cold-rolled steel sheet having the following chemical composition was used.

The composition of base chemical components: C: 200 ppm, Mn: 2700 ppm, Si: 10 ppm or less, P: 10 ppm or less and inevitable impurities.

The prepared steel sheet was subjected to alkaline degreasing, alkaline electrolytic degreasing and pickling (sulfuric acid aqueous solution), followed by electrolyte Ni plating under the following conditions. Ni plating coating weights were different on top and bottom surfaces, and were set to 10 g/m$^2$ and 30 g/m$^2$, respectively, and the weight of the Ni-plated layer was determined by measuring a coating weight using an X-ray fluorescence spectrometer (XRF). Components of the Ni plating solution used herein are as follows.

Composition of plating bath: 200 g/L of nickel sulfate, 40 g/L of nickel chloride, and 40 g/L of boric acid
pH of plating bath: 3.2 to 4.5
Temperature of plating bath: 60° C.
Current density: 15 ASD After the Ni-plated layer was formed under the above-described conditions, to form an Fe—Ni alloy layer, box heat treatment for alloying and continuous heat treatment for alloying were performed. The box heat treatment for alloying was performed at 400° C. for 1,500 hours under a reducing atmosphere, and the continuous heat treatment for alloying was performed at 550° C. for 2,000 seconds under a reducing atmosphere, thereby forming an Fe—Ni alloy layer. Subsequently, a Ni-plated and thermally treated steel sheet was prepared by temper rolling.

Examples 2 to 9 and 11 to 18

A Ni-plated and thermally treated steel sheet was prepared in the same manner as in Example 1, except that a Ni plating weight and heat treatment conditions for alloying were changed as shown in Table 1 below.

Comparative Examples 1 to 4

A Ni-plated and thermally treated steel sheet was prepared in the same manner as in Examples, except that a Ni plating weight is changed, or heat treatment for alloying was omitted or performed in a different manner as shown in Table 1 below.

<Evaluation Methods>

(1) Analysis of Ni Content in Alloy Layer

A Ni content in an Ni—Fe alloy layer was measured by the following method.

To analyze an Ni—Fe content ratio of an alloy layer (Ni—Fe layer), a pure Ni layer, which is the uppermost layer, was completely and selectively removed using Ni-removing solutions, an Ni content alloyed on the surface was measured with 100× magnification, an accelerating voltage of 20 kV and secondary energy count incident on EDS equipment of 2 kcps or more using a scanning electron microscope (SEM) and EDS, and whether or not to satisfy Formula 1 was confirmed.

$$0.1 \leq \{Ni/(Ni+Fe)*100\} < 30 \qquad \text{<Formula 1>}$$

In Formula 1, Ni represents the content of Ni remaining in a Ni—Fe alloy layer measured by energy dispersive spectrometry (EDS) or electron probe X-ray microanalysis (EPMA) after a Ni-plated layer (Pure Ni Layer) is completely removed, and Fe represents the mass percent of Fe alloyed in a Ni—Fe alloy layer measured by EDS or EPMA after a Ni-plated layer (Pure Ni Layer) is completely removed.

(2) Corrosion resistance test: Specimens having a size of 100 mm×100 mm were obtained from the steel sheet manufactured in Examples and Comparative Examples. The degrees of corrosion resistance of the specimens were evaluated by elongating the specimens approximately 25%, spraying brine (brine composition: mixed solution of NaCl and pure water, concentration: 5%), and then maintaining them at 35° C. for 2 to 4 hours, according to the method of corrosion resistance test of plating (KSD8334).

The specimens which had been subjected to the corrosion resistance test were observed with the naked eye, and corrosion areas thereof were measured and evaluated according to the following criteria. The result is shown in Table 1 below.

A: No corrosion site was observed in the entire area of the specimen.

B: Corrosion occurred in 1% or more and less than 10% of the entire area of the specimen.

C: Corrosion occurred in the area of 10% or more and less than 50% of the entire area of the specimen.

D: Corrosion occurred in the area of 50% or more of the entire area of the specimen.

TABLE 1

| | Example | | Ni plating weight (g/m$^2$) | Conditions for alloying heat treatment | | <Formula 1> | Corrosion resistance |
|---|---|---|---|---|---|---|---|
| | | | | Temperature (° C.) | Time | | |
| Box heat treatment | Example 1 | Top surface | 30 | 400 | 1500 hrs | 28.5 | B |
| | | Bottom surface | 15 | | | 19.2 | A |
| | Example 2 | Top surface | 30 | 400 | 100 hrs | 7.4 | A |
| | | Bottom surface | 10 | | | 5.1 | A |
| | Example 3 | Top surface | 30 | 400 | 20 hrs | 3.3 | A |
| | | Bottom surface | 5 | | | 2.3 | B |
| | Example 4 | Top surface | 30 | 450 | 60 hrs | 26.0 | B |
| | | Bottom surface | 10 | | | 18.1 | B |
| | Example 5 | Top surface | 30 | 450 | 30 hrs | 18.4 | A |
| | | Bottom surface | 15 | | | 12.8 | A |
| | Example 6 | Top surface | 30 | 450 | 2 hrs | 4.8 | A |
| | | Bottom surface | 10 | | | 3.3 | A |
| | Example 7 | Top surface | 30 | 500 | 5 hrs | 28.2 | B |
| | | Bottom surface | 10 | | | 19.6 | B |
| | Example 8 | Top surface | 30 | 500 | 3 hrs | 21.8 | A |
| | | Bottom surface | 10 | | | 15.2 | B |
| | Example 9 | Top surface | 30 | 500 | 1 hr | 12.6 | A |
| | | Bottom surface | 10 | | | 8.8 | A |
| Continuous heat treatment | Example 10 | Top surface | 30 | 550 | 2000 sec | 30.0 | B |
| | | Bottom surface | 10 | | | 20.9 | B |
| | Example 11 | Top surface | 30 | 550 | 300 sec | 11.6 | A |
| | | Bottom surface | 10 | | | 8.1 | A |
| | Example 12 | Top surface | 30 | 550 | 30 sec | 3.7 | A |
| | | Bottom surface | 10 | | | 2.6 | A |
| | Example 13 | Top surface | 30 | 600 | 200 sec | 26.5 | B |
| | | Bottom surface | 5 | | | 18.5 | B |
| | Example 14 | Top surface | 30 | 600 | 30 sec | 10.3 | A |
| | | Bottom surface | 10 | | | 7.2 | A |
| | Example 15 | Top surface | 30 | 600 | 8 sec | 5.3 | A |
| | | Bottom surface | 10 | | | 3.7 | A |
| | Example 16 | Top surface | 30 | 650 | 40 sec | 29.7 | B |
| | | Bottom surface | 5 | | | 20.7 | B |
| | Example 17 | Top surface | 30 | 650 | 20 sec | 21.0 | A |
| | | Bottom surface | 15 | | | 14.6 | A |
| | Example 18 | Top surface | 30 | 650 | 1 sec | 4.7 | A |
| | | Bottom surface | 10 | | | 3.3 | A |

TABLE 1-continued

| Example | | Ni plating weight (g/m$^2$) | Conditions for alloying heat treatment Temperature (° C.) | Time | <Formula 1> | Corrosion resistance |
|---|---|---|---|---|---|---|
| Comparative Example 1 | Top surface | 30 | — | — | 0 | D |
| | Bottom surface | 10 | | | 0 | D |
| Comparative Example 2 | Top surface | 40 | — | — | 0 | D |
| | Bottom surface | 10 | | | 0 | D |
| Comparative Example 3 (Box heat treatment) | Top surface | 30 | 500 | 15 hrs | 48.8 | C |
| | Bottom surface | 5 | | | 34.0 | C |
| Comparative Example 4 (Continuous heat treatment) | Top surface | 30 | 650 | 100 sec | 47.0 | C |
| | Bottom surface | 10 | | | 32.7 | C |

As seen from the results of Table 1, in the case of the Ni-plated and thermally treated steel sheets of Examples 1 to 18 in which values shown in Formula 1 of the present invention were controlled to 0.1 to 30, excellent corrosion resistance was exhibited.

On the other hand, Comparative Examples 1 and 2 in which a Ni-alloy layer was not formed and thus the values represented in Formula 1 were less than 0.1 had very low corrosion resistance and thus were unsuitable for use in a battery case. In addition, Comparative Examples 3 and 4 in which the values represented by Formula 1 were more than 30 due to excessive heat treatment also exhibited low corrosion resistance, and thus were unsuitable for use in a battery case.

In the above-described examples, the sample of each example plated within a range of the Ni plating weights suggested in the present invention was subjected to heat treatment for alloying under different conditions, and then a Ni content was analyzed using a method of analyzing a Ni content in the Ni—Fe alloy layer suggested in the present invention, resulting in obtaining different Ni content ratios according to conditions, and the analyzed Ni content ratio was indicated by a number that can be managed and a value that can be directly obtained from an analyzer without any variable or assumption of an analyst. The reproducibility was also excellent in repeated analysis.

Figure 1:
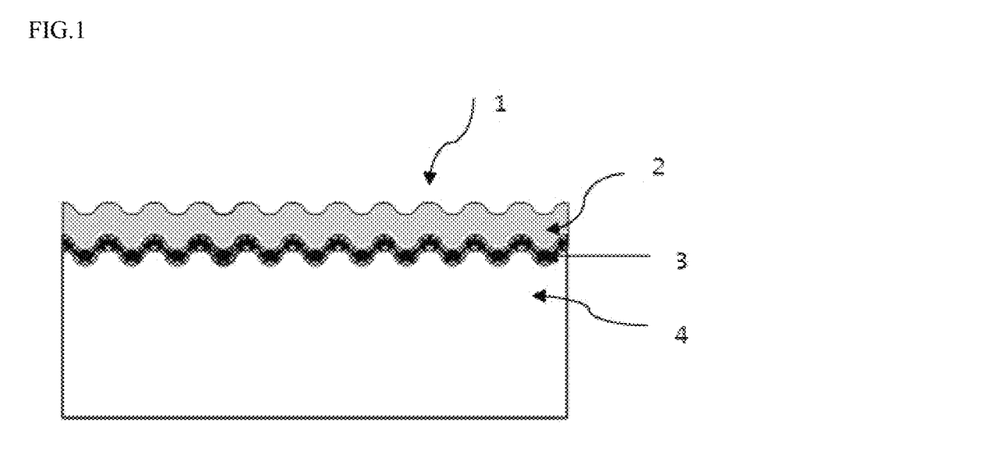
FIG. 1 is a cross-sectional view of a nickel (Ni)-plated and thermally treated steel sheet according to one embodiment of the present invention.
Figure 2:
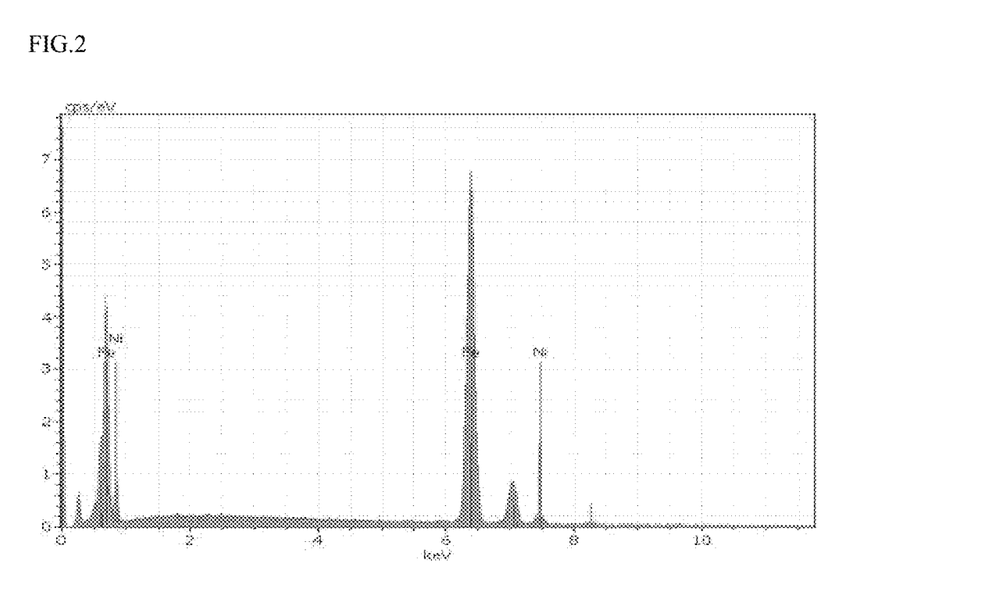
FIG. 2 is a graph showing energy dispersive spectroscopy (EDS) results for an Ni-iron (Fe) alloy layer after a pure Ni layer is removed (Ni electroplating weight: 30 g/m$^2$)
Figure 3:
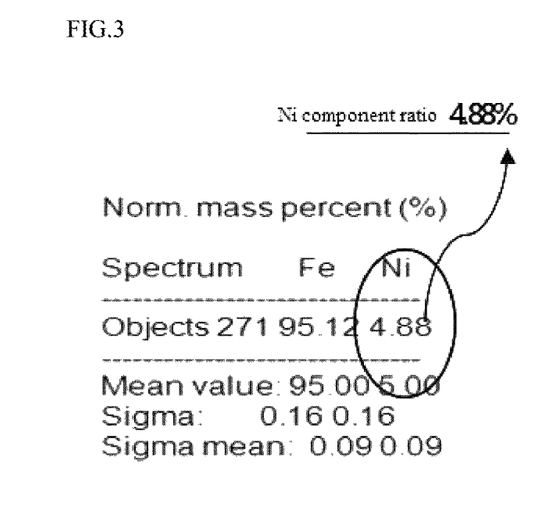
FIG. 3 is a table showing EDS results for an Ni—Fe alloy layer after a pure Ni layer is removed (Ni electroplating weight: 30 g/m$^2$)
Figure 4:
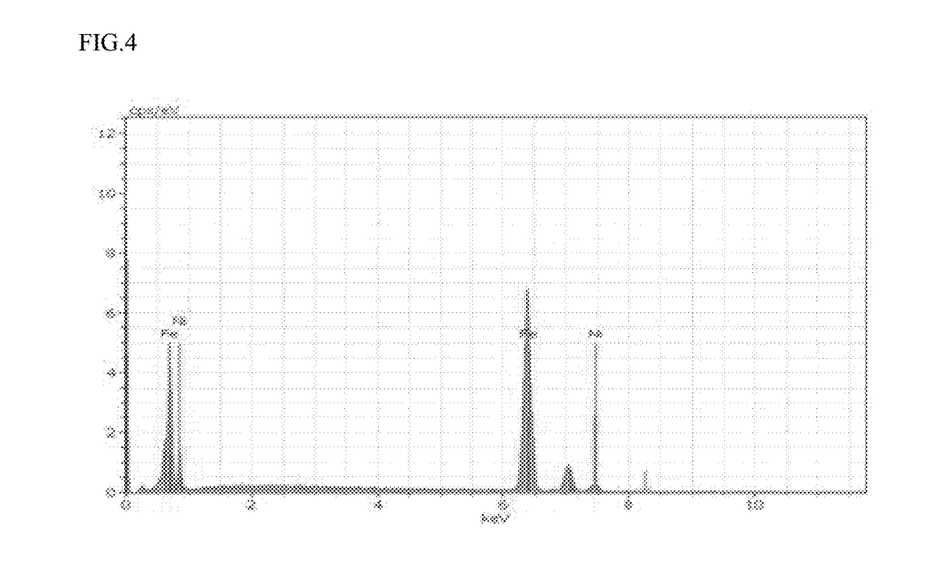
FIG. 4 is a graph showing EDS results for an Ni—Fe alloy layer after a pure Ni layer is removed (Ni electroplating weight: 10 g/m$^2$)
Figure 5:
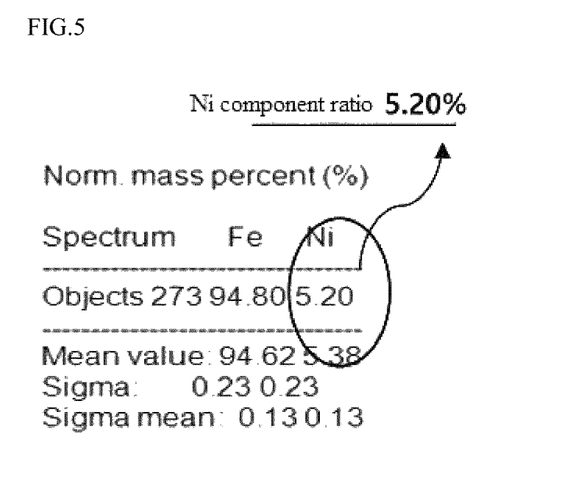
FIG. 5 is a table showing EDS results for an Ni—Fe alloy layer after a pure Ni layer is removed (Ni electroplating weight: 10 g/m$^2$)
Figure 6:
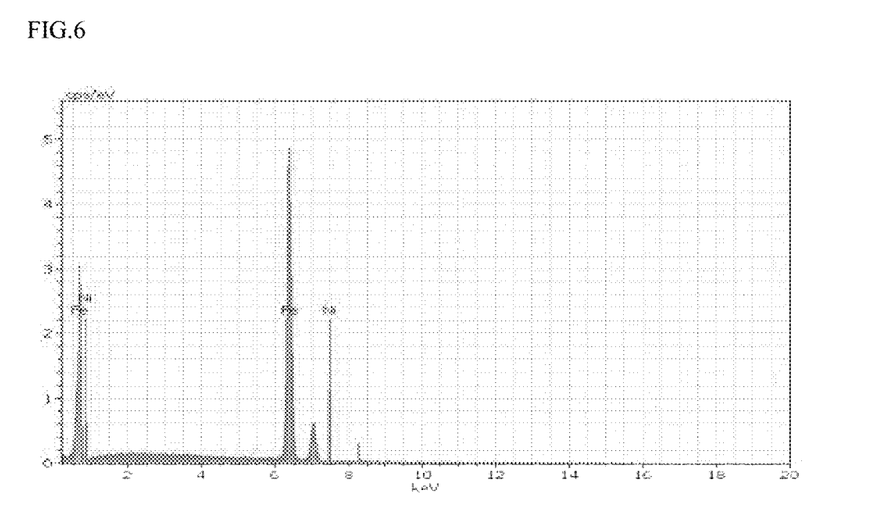
FIG. 6 is a graph showing EDS results for a base layer after a pure Ni layer is removed according to Comparative Example 1 (Ni electroplating weight: 30 g/m$^2$)
Figure 7:
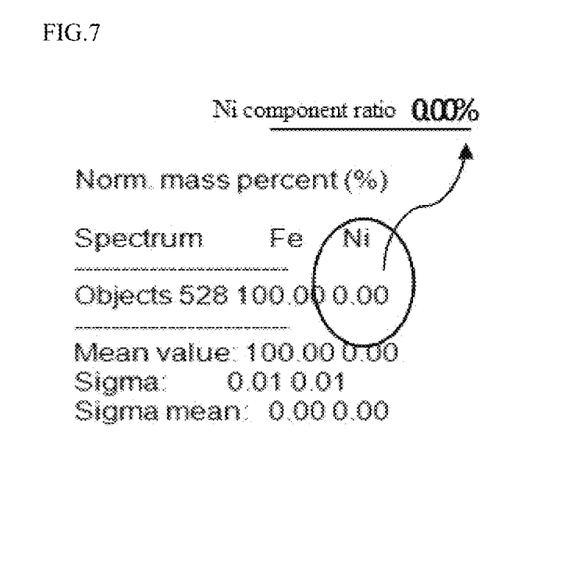
FIG. 7 is a table showing EDS results for a base layer after a pure Ni layer is removed according to Comparative Example 1 (Ni electroplating weight: 30 g/m$^2$)
Figure 8:
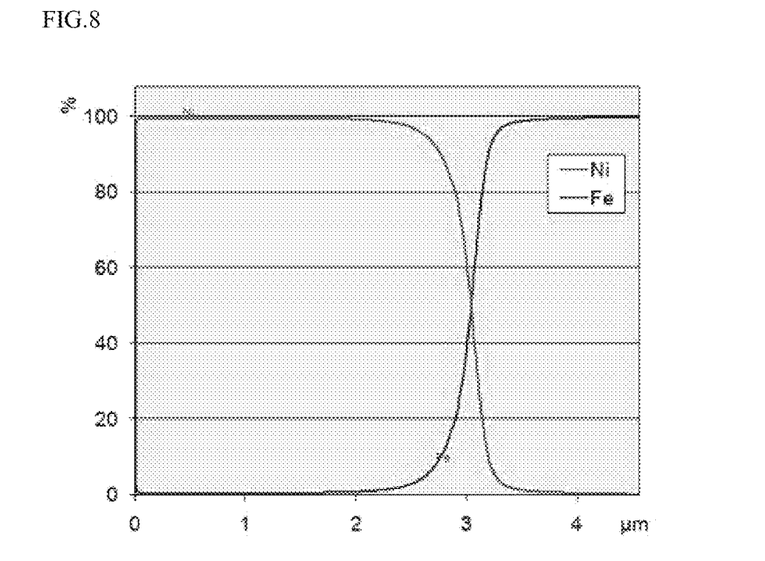
FIG. 8 is a graph showing glow discharge spectroscopy (GDS) results before alloying treatment (Ni electroplating weight: 30 g/m$^2$)
Figure 9:
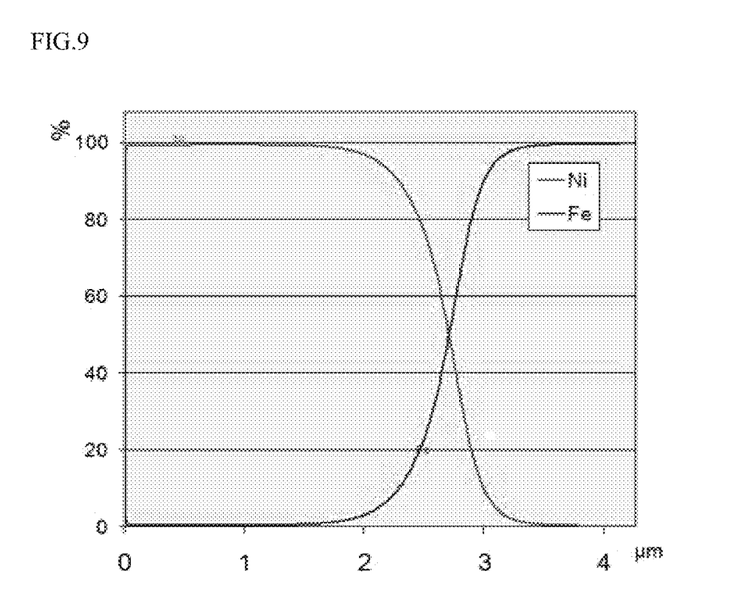
FIG. 9 is a graph showing glow discharge spectroscopy (GDS) results after alloying treatment (Ni electroplating weight: 30 g/m²).

As a result of analyzing the thickness of the Ni—Fe alloy layer using GDS in the same samples as used above, depending on the presence or absence of the heat treatment for alloying, there was a difference in the analysis result (Graph) (FIGS. 8 and 9), but the Ni—Fe alloy layer could not be objectively defined from one part to another part in the graph. That is, this method might be an analysis method lacking objectivity about the result for exactly how thick the alloy layer is.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

BRIEF DESCRIPTION OF THE DRAWINGS

1: Nickel-plated and thermally treated steel sheet
2: Nickel-plated layer (Pure nickel layer)
3: Nickel-iron alloy layer
4: Base steel sheet

What is claimed is:

1. A method of manufacturing a nickel-plated and thermally treated steel sheet for a battery case, comprising:
   forming a nickel-plated layer on at least one surface of a base steel sheet; and
   forming a nickel-iron alloy layer at the interface between the base steel sheet and the nickel-plated layer by heat treatment for alloying of the base steel sheet on which the nickel-plated layer is formed
   wherein the nickel-iron alloy layer satisfies Formula 1 below:
   wherein the nickel plated layer has a plating weight of 10 to 30 g/m$^2$ $$2.6 \leq \{Ni/(Ni+Fe)*100\} < 21.8 \quad \text{<Formula 1>}$$

in Formula 1, Ni represents the mass percent of Ni remaining in a nickel-iron alloy layer measured using an energy dispersive spectrometry (EDS) or electron probe X-ray microanalysis (EPMA) after a nickel-plated layer is completely removed, and Fe represents the mass percent of Fe alloyed in a nickel-iron alloy layer measured by EDS or EPMA after a nickel-plated layer is completely removed;
   wherein the nickel-plated and thermally treated steel sheet exhibits less than 1% corrosion when subjected to corrosion resistance testing according to KSD 8334.

2. The nickel-plated and thermally treated steel sheet for a battery case, which is formed by the manufacturing method according to claim 1, and comprises:
   a base steel sheet; and
   a nickel-plated layer formed on at least one surface of the base steel sheet; and
   a nickel-iron alloy layer formed at the interface between the base steel sheet and the nickel-plated layer.

3. The method of manufacturing the nickel-plated and thermally treated steel sheet of claim 1 wherein the heat treatment for alloying is carried out at between 400° C. to 500° C. for 1 to 1,500 hours as batch heat treatment.

4. The method of manufacturing the nickel-plated and thermally treated steel sheet of claim 1 wherein the heat treatment for alloying is carried out at between 550° C. to 650° C. for 5 to 20 seconds as continuous heat treatment.

* * * * *